United States Patent
Farmer et al.

(10) Patent No.: US 10,771,564 B2
(45) Date of Patent: Sep. 8, 2020

(54) SHARING SYSTEM MANAGED HTTP CLIENT SESSIONS ACROSS PROCESSES

(71) Applicant: INTERNATIONAL BUSINESS MACHINES CORPORATION, Armonk, NY (US)

(72) Inventors: James V. Farmer, Wappingers Falls, NY (US); Mark R. Gambino, Brewster, NY (US); Bradd A. Kadlecik, Wappingers Falls, NY (US); Daniel L. Yee, Newtown, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 282 days.

(21) Appl. No.: 15/820,498

(22) Filed: Nov. 22, 2017

(65) Prior Publication Data
US 2019/0158604 A1  May 23, 2019

(51) Int. Cl.
*H04L 29/08* (2006.01)
*H04L 29/06* (2006.01)

(52) U.S. Cl.
CPC .............. *H04L 67/14* (2013.01); *H04L 67/02* (2013.01); *H04L 67/141* (2013.01); *H04L 67/143* (2013.01); *H04L 67/42* (2013.01); *H04L 69/14* (2013.01); *G06F 2209/5016* (2013.01)

(58) Field of Classification Search
CPC ....... H04L 67/14; H04L 67/02; H04L 67/141; H04L 67/143; H04L 67/42; H04L 69/14
See application file for complete search history.

(56) References Cited

U.S. PATENT DOCUMENTS

| | | |
|---|---|---|
| 5,935,212 A | 8/1999 | Kalajan et al. |
| 6,338,089 B1 | 1/2002 | Quinlan |
| 6,397,253 B1 * | 5/2002 | Quinlan ................ G06F 16/957 709/227 |
| 6,496,824 B1 | 12/2002 | Wilf |

(Continued)

OTHER PUBLICATIONS

Belqasmi et al., "RESTful web services for service provisioning in next-generation networks: a survey," IEEE Communications Magazine 49, No. 12, 2011, pp. 1-9.

(Continued)

*Primary Examiner* — Viet D Vu
(74) *Attorney, Agent, or Firm* — Cantor Colburn LLP; Teddi Maranzano

(57) ABSTRACT

Technical solutions are described for sharing HTTP client sessions among multiple processes being executed by a client computing device. An example method includes creating a set of HTTP client sessions for a remote server. The method further includes, in response to receiving an HTTP request from an application process, the HTTP request is for communicating with the remote server, assigning an HTTP client session from the set of HTTP client sessions to the application process, and sending the HTTP request from the application process to the remote server via the HTTP client session that is assigned. The method further includes, in response to receiving a reply from the remote server, deselecting the HTTP client session from the application process, and sending the reply from the remote server to the application process.

20 Claims, 3 Drawing Sheets

(56) References Cited

U.S. PATENT DOCUMENTS

| | | | |
|---|---|---|---|
| 6,519,643 B1* | 2/2003 | Foulkes | H04L 29/06 709/223 |
| 6,535,878 B1 | 3/2003 | Guedalia | |
| 6,876,654 B1 | 4/2005 | Hegde | |
| 7,843,952 B2 | 11/2010 | Roe et al. | |
| 7,894,431 B2 | 2/2011 | Goring et al. | |
| 7,929,523 B2 | 4/2011 | Shenfield et al. | |
| 8,176,486 B2 | 5/2012 | Husain | |
| 8,458,331 B2 | 6/2013 | Chauhan | |
| 9,246,976 B2 | 1/2016 | Kang | |
| 10,069,757 B1 | 9/2018 | Young | |
| 10,453,092 B1 | 10/2019 | Wang | |
| 2002/0099844 A1* | 7/2002 | Baumann | H04L 47/10 709/232 |
| 2004/0003093 A1 | 1/2004 | Kamath | |
| 2004/0143645 A1 | 7/2004 | Cheenath | |
| 2006/0248207 A1 | 11/2006 | Olson | |
| 2007/0083524 A1 | 4/2007 | Fung | |
| 2008/0270924 A1* | 10/2008 | Yordanov | G06F 8/60 715/765 |
| 2010/0082823 A1* | 4/2010 | Cui | H04L 67/14 709/228 |
| 2010/0153432 A1 | 6/2010 | Pfeifer | |
| 2010/0161712 A1 | 6/2010 | Mehta | |
| 2011/0078703 A1 | 3/2011 | Dokovski | |
| 2011/0246640 A1 | 10/2011 | Saha | |
| 2012/0079063 A1 | 3/2012 | Brown | |
| 2012/0079111 A1* | 3/2012 | Luukkala | H04W 76/45 709/225 |
| 2015/0271271 A1 | 9/2015 | Bullotta et al. | |
| 2016/0352869 A1 | 12/2016 | Liddicott | |

OTHER PUBLICATIONS

Gang et al., "Method for converting HTTP synchronous requests to asynchronous processing, and server", 1998, ip.com translation of CN-108319508-A (Year: 2018).

GitHub, "AsyncHttpClient/async-http-client/ Asynchronous Http and WebSocket Client library for Java," Retrieved from Internet using: https://github.com/AsyncHttpClient/async-http-client, 2017, pp. 1-5.

Hu et al., "Measuring the Impact of Event Dispatching and Concurrency Models on Web Server Performance Over High-speed Networks", 1997, In Proc. of GLOBECOM 97 (Year: 1997).

J. Arcand, "Writing Portable WebSockets Application using Java," Think Thank for http://Async-IO.org, Retrieved from Internet using: https://jfarcand.wordpress.com/category/async-http-client/, May 28, 2012, pp. 1-11.

Wikipedia, "Transaction Processing Facility", Oct. 30, 2017, pp. 1-7.

James V. Farmer et al. "Asynchronously Reading HTTP Responses in Separate Process", U.S. Appl. No. 15/820,508, filed Nov. 22, 2017.

List of IBM Patents or Patent Applications Treated as Related; (Appendix P), Filed Nov. 22, 2017; 2 pages.

* cited by examiner

SHARING SYSTEM MANAGED HTTP CLIENT SESSIONS ACROSS PROCESSES

BACKGROUND

The present invention generally relates to computer technology and particularly to improving the performance of a system that executes application programs that communicate with one or more remote servers using hypertext transfer protocol (HTTP).

Hypertext Transfer Protocol (HTTP) is an application protocol, typically used by distributed information systems. The HTTP protocol is a request-reply protocol where an HTTP client sends a request to an HTTP server and the HTTP client waits for a reply from the HTTP server.

SUMMARY

Technical solutions are described for sharing HTTP client sessions among multiple processes being executed by a client computing device. An example method includes creating a set of HTTP client sessions for a remote server. The method further includes, in response to receiving an HTTP request from an application process, the HTTP request is for communicating with the remote server, assigning an HTTP client session from the set of HTTP client sessions to the application process, and sending the HTTP request from the application process to the remote server via the HTTP client session that is assigned. The method further includes, in response to receiving a reply from the remote server, deselecting the HTTP client session from the application process, and sending the reply from the remote server to the application process.

Further, according to one or more embodiments, a system includes a server, and a client device that communicates with the server using HTTP. The client device shares HTTP client sessions among multiple application processes being executed by the client device. The client device facilitates the sharing of a HTTP session by creating a set of HTTP client sessions for a remote server. The sharing further includes, in response to receiving an HTTP request from an application process, the HTTP request is for communicating with the remote server, assigning an HTTP client session from the set of HTTP client sessions to the application process, and sending the HTTP request from the application process to the remote server via the HTTP client session that is assigned. The sharing further includes, in response to receiving a reply from the remote server, deselecting the HTTP client session from the application process, and sending the reply from the remote server to the application process.

According to one or more embodiments, a computer program product includes a computer readable storage medium having program instructions embodied therewith, the program instructions executable by a processing circuit of a client computing device to cause the processing circuit to share HTTP client sessions among multiple processes. The processing circuit performs the sharing by creating a set of HTTP client sessions for a remote server. The sharing further includes, in response to receiving an HTTP request from an application process, the HTTP request is for communicating with the remote server, assigning an HTTP client session from the set of HTTP client sessions to the application process, and sending the HTTP request from the application process to the remote server via the HTTP client session that is assigned. The sharing further includes, in response to receiving a reply from the remote server, deselecting the HTTP client session from the application process, and sending the reply from the remote server to the application process.

It is to be understood that the technical solutions are not limited in application to the details of construction and to the arrangements of the components set forth in the following description or illustrated in the drawings. The technical solutions are capable of embodiments in addition to those described and of being practiced and carried out in various ways. Also, it is to be understood that the phraseology and terminology employed herein, as well as the abstract, are for the purpose of description and should not be regarded as limiting. As such, those skilled in the art will appreciate that the conception upon which this disclosure is based may readily be utilized as a basis for the designing of other structures, methods and systems for carrying out the several purposes of the presently described technical solutions.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
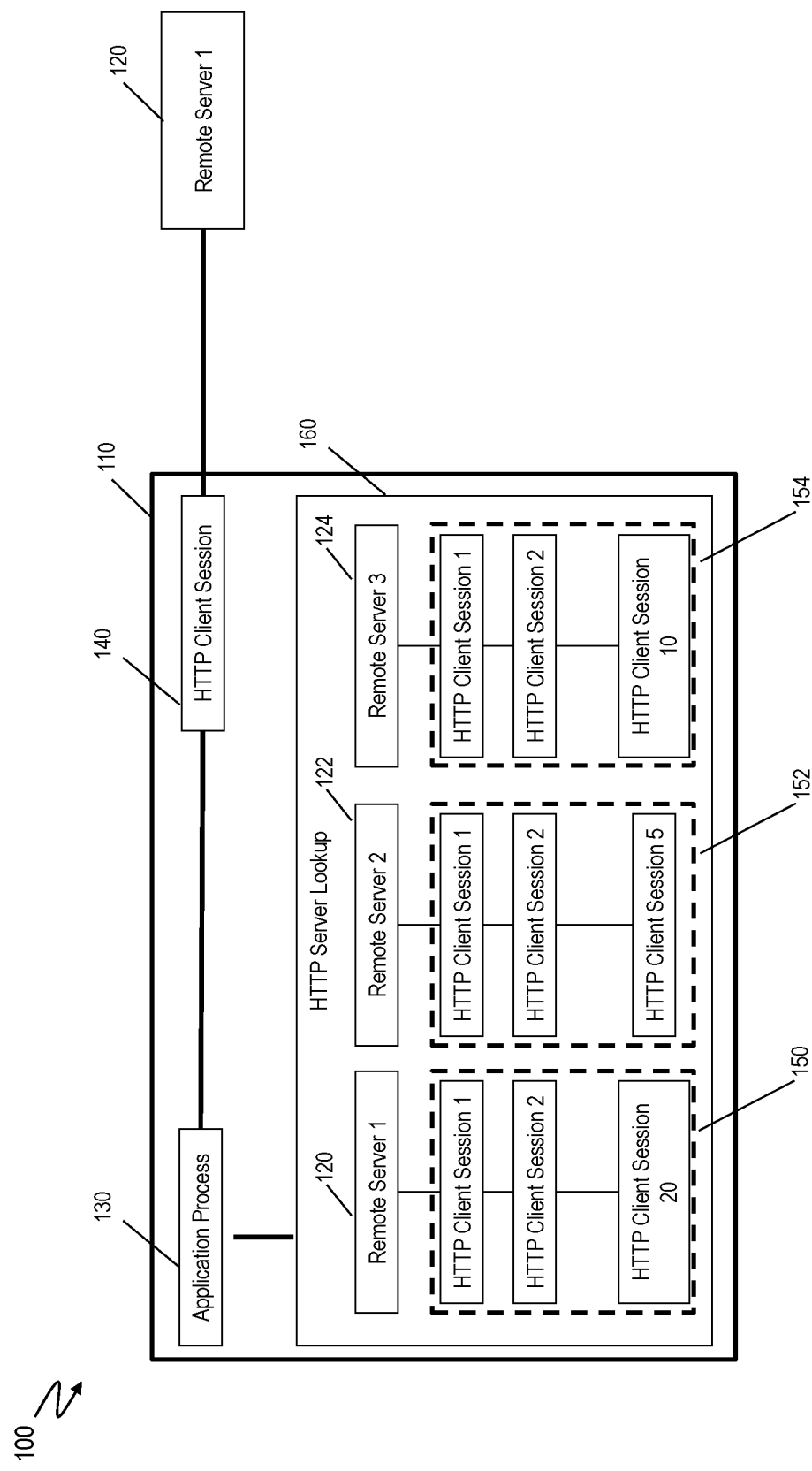
FIG. 1 depicts an example system for sharing HTTP client sessions among multiple processes according to one or more embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Typically, an HTTP client session is tied to an application process that initiated the HTTP client session. The application process initiates the HTTP client session, for example by generating an HTTP request to be sent to an HTTP server. The HTTP server may be a remote computer, such as a server that provides a reply to the HTTP request. The application process that initiated the HTTP client session has to remain un-terminated until the HTTP client session completes the communication. Once the application process does terminate, the HTTP client session initiated by that application process is also terminated. However, a technical challenge exists, that the cost of initiating an HTTP client session for every application process that sends HTTP client requests to corresponding remote servers is substantial, both in terms of processor consumption and latency because of multiple network flows. This cost of initiating HTTP client sessions can be further exasperated by securing the session with the HTTPS (secure) protocol, for example by way of Transport Layer Security (TLS), or any other security technique. The HTTP client sessions described herein and used by the technical solutions described herein include persistent HTTP sessions that remain active after a request/reply has been communicated, so that further request/reply can use the persisted session.

For example, on a system that executes multiple application processes that communicate with the same set of remote HTTP servers, each process maintains its own set of HTTP sessions. As described earlier, such multiple HTTP client sessions are costly from system resource point of view (both from the HTTP client platform and the HTTP server) and whenever new application processes are started (or existing application processes recycle), new HTTP sessions are established for that process. Typical implementations to address the technical problem include separating the HTTP client sessions from the application processes so that one set of HTTP sessions can be used by all the application processes. Typically, the HTTP client sessions are managed by an HTTP client process that communicates with the application processes to facilitate using the HTTP client sessions. However, technical challenges with that approach include having extra overhead to pass data between the application processes and HTTP client process. Further, the technical challenges include having to restart all the HTTP client sessions if the HTTP client process fails or has to be recycled. The technical solutions described herein address such technical challenges.

In one or more examples, the technical solutions described herein address the technical challenges by facilitating a shared pool of pre-established HTTP client sessions to be used by any application process of the client system that has to send an HTTP client request to a remote HTTP server, where the HTTP session can be used directly by the application process, without using a separate HTTP client process. In one or more examples, the pre-established HTTP client sessions are managed by the operating system of the client node, thus facilitating the application processes to use the HTTP client sessions without the HTTP client process. With the set of pre-established HTTP client sessions, the cost of initiating a new HTTP client session by each application process created is eliminated.

Further, the technical solutions described herein, by using the operating system to manage the pre-established HTTP client sessions, avoid using an HTTP client process as the initiator or owner of the HTTP client sessions. The HTTP client sessions being managed by the operating system itself, and not requiring the HTTP client process to manage or maintain an HTTP client session, further improves the performance of the system, by eliminating inter-process communication (IPC) between the application processes and the HTTP client process.

FIG. 1 depicts an example system 100 for sharing HTTP client sessions among multiple processes according to one or more embodiments of the present invention. The system 100 includes, among other components, a client computing device 110 in communication with a remote server 120. The computing device 110 communicates with the remote server 120 via a communication network via one or more communication nodes, such as routers, gateways, access points, and other such nodes in a wired or a wireless manner. The communication network may be Ethernet, WIFI, 4G, 3G, LTE, or any other type of communication network or a combination thereof. The client computing device 110 communicates with the remote server 120 in response to an application process 130, which is being executed by the client computing device 110, sending and/or receiving data to/from the remote server 120.

The application process 130 may be an application program such as a web-browser, an e-commerce application, a payment portal, a computer game, an e-book, or any other type of application that accesses the remote server 120 for completion of one or more operations. The communication may be using the HTTP and/or the HTTPS protocol. It should be noted that the application process 130 may be one of other application processes that are being executed by the client computing device 110, and in one or more examples may be one of the multiple instances of the application process that are being executed.

The application process 130 establishes communication with the remote server 120 via an HTTP client session 140. HTTP client sessions are maintained by a higher level program using a method defined in the data being exchanged. For example, an HTTP exchange between a browser (application process) and a remote server may include an HTTP cookie which identifies the state, such as a unique session ID, information about the user's preferences or authorization level, and other state parameters.

For example, HTTP communication uses a Common Gateway Interface (CGI) that facilitates maintaining an HTTP client session and supporting HTTP cookies and file uploads. Typically, the client-server sessions are maintained by the transport layer—a single connection for a single session. However, each transaction phase of a Web/HTTP session creates a separate connection. Maintaining session continuity between phases requires a session ID. The session ID is embedded within the <A HREF> or <FORM> links of dynamic web pages so that it is passed back to the CGI. CGI then uses the session ID to ensure session continuity between transaction phases. It should be noted that HTTP communication may be used by application processes differently than the above description. For example, HTTP is used at the transport for REST APIs to that mobile/cloud users can consume services on the server 120, such as applications and database servers (such as IBM® Z/TPF). Alternatively, or in addition, the application process 130 can also use HTTP to transport proprietary message formats. In other words, the application process 130 may be any type of client application (browser, REST client, user application, and so on) that is using HTTP, the technical solutions described herein facilitating improvements for execution of such application process 130.

The HTTP client session 140 is one from a set of HTTP client sessions 150 for the remote server 120. Further, the set 150 is one set of HTTP client sessions from an HTTP server lookup 160, which includes multiple sets of HTTP client sessions, each set associated with a corresponding remote server. For example, the HTTP server lookup 160 includes the set 150 that is associated with the remote server 120 (e.g. YAHOO.COM™), a second set of HTTP client sessions 152 that is associated with a second remote server 122 (e.g. IBM.COM™), a third set of HTTP client sessions 154 that is associated with a third remote server 124 (e.g. GOOGLE.COM™), and the like. It should be noted that in other examples, the HTTP server lookup 160 includes a different number of (more/less) sets of HTTP client sessions than depicted here, and further, the sets may be associated with different remote servers than the examples described herein.

The sets of HTTP client sessions 150, 152, 154, in the HTTP server lookup 160, are pre-established by an operating system (OS) of the client computing device 110. In one or more examples, the HTTP client sessions may be established at the time of system startup by the OS. Alternatively, in one or more examples, the HTTP client sessions are established at the time of startup of the application process 130. For example, the OS may monitor the frequency of communications with the remote server 120 and upon the frequency being at least a predetermined threshold, the OS may initiate and maintain the set of HTTP client sessions 150 for the remote server 120 in the HTTP server lookup 160 at system startup. Alternatively, or in addition, the OS may monitor the frequency of communication of the application process 130 with the remote server 120, and if the communication of the application process 130 exceeds at least a predetermined threshold, upon initiation of the application process 130, the OS initiates and maintains the set of HTTP client sessions 150 for the remote server 120.

In one or more examples, the OS maintains a different number of HTTP client sessions in each set 150, 152, and 154, based on the number of application processes communicating with the corresponding remote servers 120, 122, and 124, as depicted in FIG. 1. It should be noted that the number of sessions depicted are examples, and that in other embodiments, a different number of sessions may be maintained for the remote servers.

The HTTP client sessions from the sets 150, 152, and 154, (and in turn from the lookup 160) do not have an application process as an owner, rather the OS initiates and maintains the sessions. Further, the HTTP client sessions from the lookup 160 are stored and maintained in shared memory of the client computing device 110, such that one or more application processes executing on the client computing device 110 can access and use the HTTP client sessions from the lookup 160. The application process 130 can access the HTTP client session 140 only if the HTTP client session 140 is not already in use by another application process.

The OS maintains state parameters of the HTTP client sessions in the lookup 160 to determine whether a client session is in use. For example, the client session 140 is associated with one or more state parameters including an in-use flag, request-status flag, response status flag, a unique remote-server identifier, a unique session identifier, a memory address, and a unique application-process identifier, among others. Based on the state parameters, the OS can determine if the session is in use (in-use flag), and if so, by which application process (application-process identifier). Further, the OS can determine which remote server the HTTP client session 140 is associated with (remote-server identifier).

Further, the OS maintains lists of the preestablished HTTP client sessions for each remote server 120, 122, and 124, to lookup the HTTP client sessions associated with each of the remote servers upon receipt of a communication request. For example, a list of HTTP client sessions for the remote server 120 includes unique session identifiers of the HTTP client sessions from the set 150. In one or more examples, the list may also maintain the memory addresses of the sessions from the set 150 for the OS to access the client sessions more efficiently.

Figure 2:
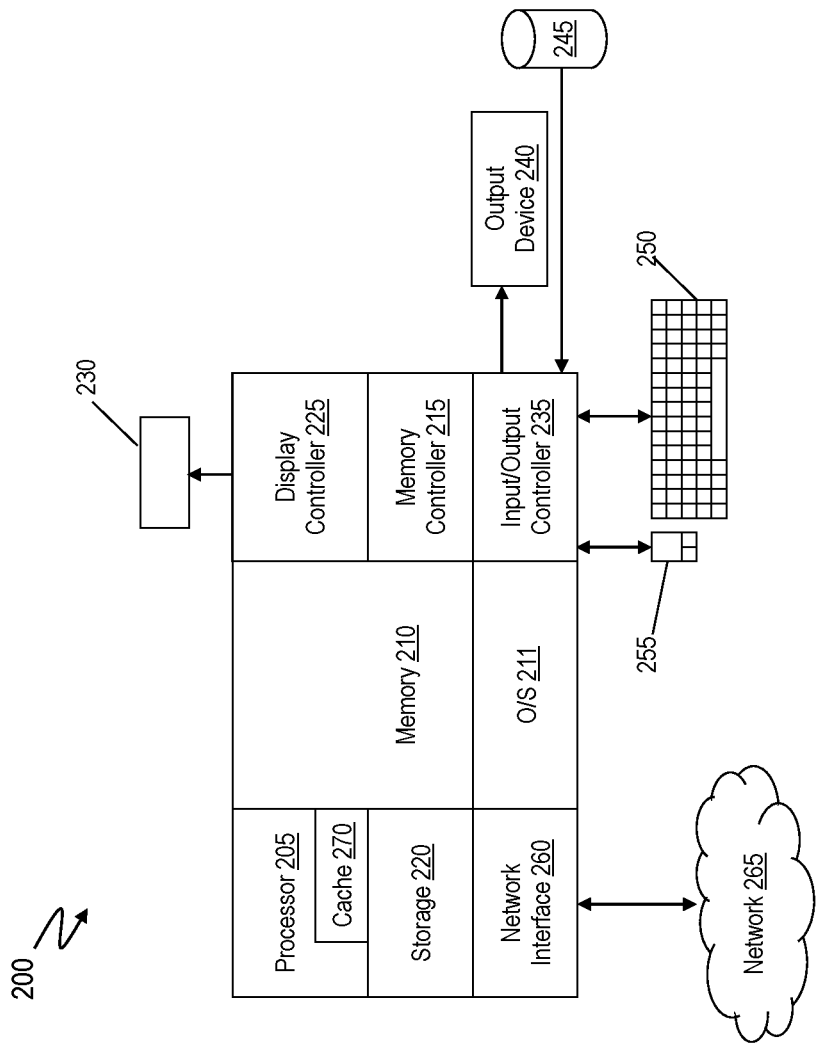
FIG. 2 illustrates an example system according to one or more embodiments.

FIG. 2 illustrates an example system 200 according to one or more embodiments. The system 200 may be a communication apparatus, such as a computer. For example, the system 200 may be a desktop computer, a tablet computer, a laptop computer, a phone, such as a smartphone, a server computer, or any other device that communicates via a network 265. The system 200 includes hardware, such as electronic circuitry. In one or more examples, the system 200 is any one or more of the devices depicted in FIG. 1, such as the client computing device 110, the remote server 120, and the like.

The system 200 includes, among other components, a processor 205, memory 210 coupled to a memory controller 215, and one or more input devices 245 and/or output devices 240, such as peripheral or control devices, which are communicatively coupled via a local I/O controller 235. These devices 240 and 245 may include, for example, battery sensors, position sensors, indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The system 200 may further include a display controller 225 coupled to a user interface or display 230. In some embodiments, the display 230 may be an LCD screen. In other embodiments, the display 230 may include a plurality of LED status lights. In some embodiments, the system 200 may further include a network interface 260 for coupling to a network 265. The network 265 may be an IP-based network for communication between the system 200 and an external server, client and the like via a broadband connection. In an embodiment, the network 265 may be a satellite network. The network 265 transmits and receives data between the system 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
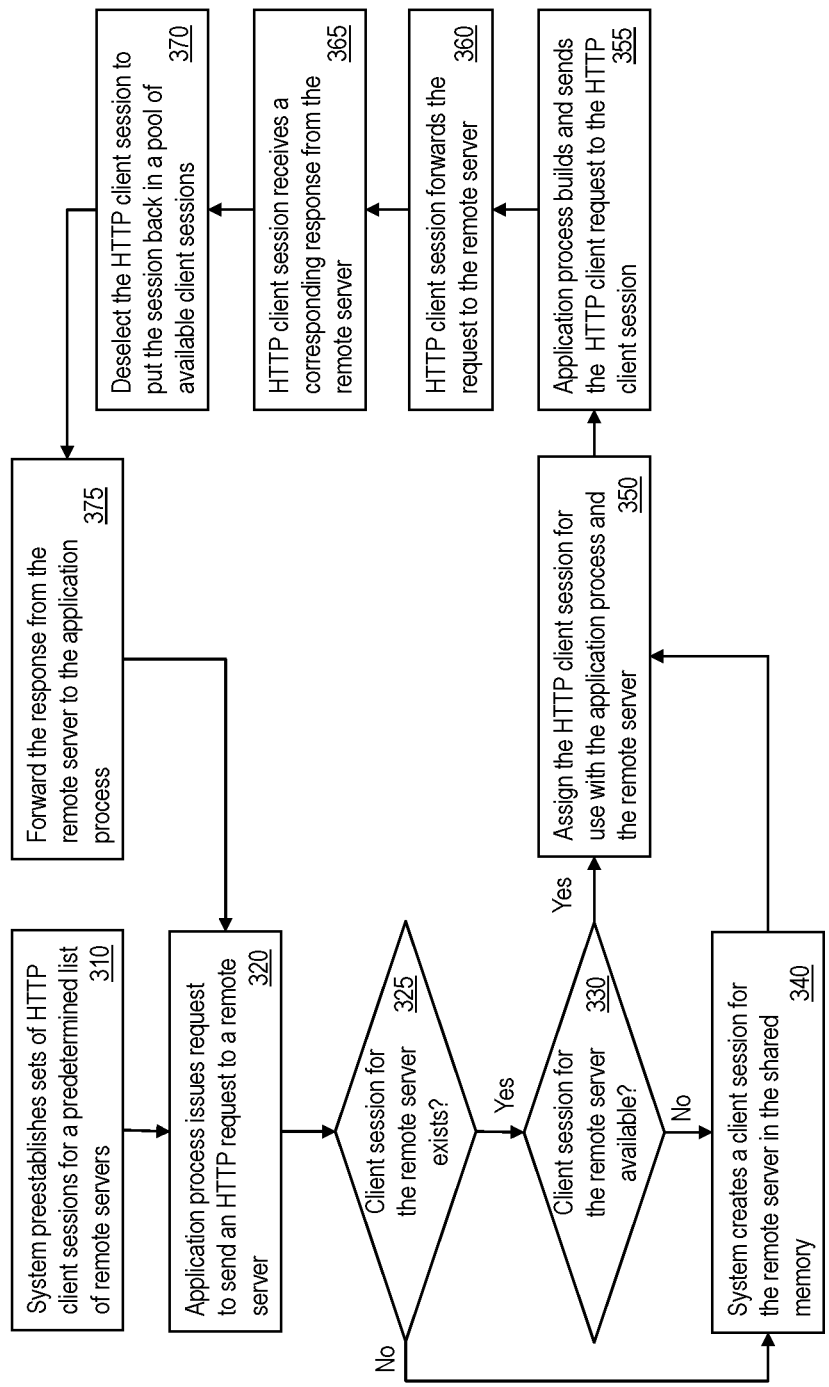
FIG. 3 depicts a flowchart of an example method for sharing HTTP client sessions among multiple processes according to one or more embodiments.

FIG. 3 depicts a flowchart of an example method for sharing HTTP client sessions among multiple processes according to one or more embodiments. The method is implemented by one or more of the components of the system 100. The method includes the OS 211 of the computing device 110 to preestablish the set of HTTP client sessions 150 for the remote server 120, at 310. In one or more examples, the OS 211 establishes the multiple sets of HTTP client sessions for a predetermined list of remote servers. The predetermined list of remote servers is configurable, in one or more examples. In addition, or alternatively, the OS 211 monitors the one or more remote servers that are frequently communicated by the application programs executed by the client computing device 110. Based on the monitoring, remote servers that are communicated with at least a predetermined number of times are added to the predetermined list of remote servers.

Establishing the set of HTTP client session by the OS 211, in one or more examples, includes configuring a kernel socket for each HTTP client session. Each kernel socket is associated with a data structure that records the state parameters of the corresponding HTTP client session. Thus, the OS owned/controlled sockets form the preestablished sets of HTTP client sessions for the one or more remote servers from the predetermined list.

Further, referring to FIG. 3, the application process 130 that is executing on the client computing device 110, issues a request to send an HTTP request to the remote server 120, at 320. For example, the application process 130 uses an HTTP client API to send the HTTP request to the HTTP remote server 120 and receive a corresponding HTTP reply message from the server 120.

The OS 211 checks if an HTTP client session for the remote server 120 already exists in the shared memory in the HTTP client session lookup 160, at 325. The remote server 120 is determined from the API call issued by the application process 130. The OS 211 can check for the existence of the HTTP client session for the remote server by comparing if the remote server exists in a list of remote servers for which HTTP client sessions have been already established.

If the client session 140 associated with the remote server exists, the OS 211 checks if the client session 140 is available for use, or if it is already in use, at 330. In one or more examples, the OS 211 identifies multiple HTTP client sessions in the set of client sessions 150 for the remote server 120. In this case, the OS 211 checks if any of the client sessions from the set 150 is available for use. The OS 211 can determine the availability of an HTTP client session based on the state parameters of the session, for example, the in-use flag.

If an available HTTP client session for the remote server is not identified, the OS 211 creates a new HTTP client session for the remote server 120 in the shared memory, at 340. The creation of the client session may include configuring a kernel socket and associating a set of state parameters to the kernel socket. The state parameters of the socket/session are configured to indicate default values at creation.

The method further includes assigning the newly created client session as the HTTP client session 140 for use with the application process 130 and the remote server 120, at 350. Alternatively, if an existing HTTP client session is available, the OS 211 assigns the client session to be used as the HTTP client session 140 for communicating the request/response between the application process 130 and the remote server 120, at 350.

For example, assigning the HTTP client session 140 includes configuring the state parameters of the client session to indicate that that HTTP client session is associated with the remote server 120, is in-use, and is being used by the application process 130. Further, in case of the newly created client session, the set of HTTP client sessions 150 for the remote server is updated to include the newly created session, for example, by including the identifier of the newly created HTTP session in a list of sessions associated with the remote server 120, and further associating a memory address of the session with the identifier.

Further, the method includes building and sending an HTTP client request, by the application process 130, to the HTTP client session 140, at 355. Further, the HTTP client session 140 forwards the request to the remote server 120, at 360. Further yet, the HTTP client session 140 receives a corresponding response from the remote server 120, at 365.

The method further includes deselecting the HTTP client session 140 and putting the session back into the lookup 160, at 370. The OS 211 deselects the HTTP client session 140 by reconfiguring the state parameters associated with the HTTP client session 140. For example, the in-use flag is set to indicate available. Further, the HTTP response received from the remote server 120 is forwarded to the application process 130, at 375. It should be noted that once the OS 211 relinquishes control to the application process 130, the OS 211 may no longer control parameters of the application process 130, such as an HTTP client session associated with the application process 130. Hence, the sequence of operations is for the OS 211 to deselect the HTTP client session 140 first, marking that it is no longer in-use and, subsequently, returning control to the application process 130 passing back the reply from the server 120.

The method is repeated in this manner for the application process 130 issuing additional HTTP requests, or for any other application process executing on the client computing device 110. Thus, in one or more examples, the same HTTP client session 140 from the shared memory may be used by two or more separate application processes to send respective HTTP requests and receive a corresponding response to/from the remote server 120 that the HTTP client session 140 is associated with. Further, it should be noted that in case the HTTP client session 140 is newly created, it is not deleted, rather deselected, and may be reused for subsequent HTTP request(s) to the remote server 120.

The technical solutions described herein facilitate a shared pool of pre-established HTTP sessions for use by any application process that has to send an HTTP client request to a remote server, and the HTTP session can be used directly by the application process (without a separate HTTP client process). The HTTP sessions are ownerless, and shared among the application processes, by a client computing device that executes the application processes. Further, an HTTP session from the shared pool of sessions is maintained by the system in a shared memory space rather than in a memory space of an application process using the HTTP session, thus facilitating the sharing of the HTTP session across the multiple application processes.

In one or more examples, the client computing device may preestablish one or more HTTP sessions for a set of predetermined remote servers. One of the preestablished HTTP sessions is subsequently selected for communication with a remote server in response to receiving a request for HTTP communication with the remote server from an application process.

Further, the same HTTP session can be used by multiple application processes to communicate with the remote server.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for sharing HTTP client sessions among multiple processes being executed by a client computing device, the method comprising:
    creating, by an operating system of the client computing device, a set of HTTP client sessions for a remote server, wherein the set of HTTP client sessions for the remote server are created at startup of the client computing device in response to a frequency of communication of the client computing device with said remote server prior to the startup is at least a predetermined threshold;

in response to receiving an HTTP request from an application process, the HTTP request is for communicating with the remote server:
  assigning an HTTP client session from the set of HTTP client sessions to the application process; and
  sending the HTTP request from the application process to the remote server via the HTTP client session that is assigned; and
in response to receiving a reply from the remote server:
  disassociating the HTTP client session from the application process; and
  sending the reply from the remote server to the application process.

2. The computer-implemented method of claim 1, the application process being a first application process, the HTTP request being a first HTTP request, the method further comprising:
  in response to receiving a second HTTP request from a second application process, the second HTTP request is for communicating with said remote server:
    assigning said HTTP client session from the set of HTTP client sessions to the second application process; and
    sending the second HTTP request from the second application process to said remote server via said HTTP client session.

3. The computer-implemented method of claim 1, wherein the set of HTTP client sessions includes a predetermined number of HTTP client sessions.

4. The computer-implemented method of claim 3, wherein the predetermined number is specific to the remote server based on the frequency of communication with the remote server.

5. The computer-implemented method of claim 1, wherein assigning the HTTP client session to the application process comprises setting an in-use flag associated with the HTTP client session and configuring an application-identifier parameter of the HTTP client session to an identifier of the application process.

6. The computer-implemented method of claim 1, wherein the HTTP client session is stored in a shared memory accessible by multiple application processes on the client computing device.

7. A system comprising:
  a server; and
  a client device that communicates with the server using HTTP, the client device configured to share HTTP client sessions among multiple application processes being executed by the client device, the client device configured to:
    create a set of HTTP client sessions for the server at startup of the client device, wherein the set of HTTP client sessions for the remote server are created at startup of the client device in response to a frequency of communication of the client device with said remote server prior to the startup being at least a predetermined threshold;
    in response to receiving an HTTP request from an application process, the HTTP request is for communicating with the server:
      assign an HTTP client session from the set of HTTP client sessions to the application process; and
      send the HTTP request from the application process to the server via the HTTP client session that is assigned; and
    in response to receiving a reply from the server:
      deselect the HTTP client session from the application process; and
      send the reply from the server to the application process.

8. The system of claim 7, wherein the application process is a first application process, the HTTP request is a first HTTP request, the client device further configured to:
  in response to receiving a second HTTP request from a second application process, the second HTTP request is for communicating with said server:
    assign said HTTP client session from the set of HTTP client sessions to the second application process; and
    send the second HTTP request from the second application process to said server via said HTTP client session.

9. The system of claim 7, wherein the set of HTTP client sessions includes a predetermined number of HTTP client sessions.

10. The system of claim 9, wherein the predetermined number is specific to the server based on the frequency of communication with said server.

11. The system of claim 7, wherein assigning the HTTP client session to the application process comprises setting an in-use flag associated with the HTTP client session and configuring an application-identifier parameter of the HTTP client session to an identifier of the application process.

12. The system of claim 7, wherein the HTTP client session is stored in a shared memory accessible by multiple application processes on the client device.

13. A computer program product comprising a computer readable storage medium having program instructions embodied therewith, the program instructions executable by a processing circuit of a client computing device to cause the processing circuit to share HTTP client sessions among multiple processes, the processing circuit configured to perform:
  creating a set of HTTP client sessions for a remote server at startup of the client computing device, wherein the set of HTTP client sessions for the remote server are created at startup of the client computing device in response to a frequency of communication of the client computing device with said remote server prior to the startup is at least a predetermined threshold;
  in response to receiving an HTTP request from an application process, the HTTP request is for communicating with the remote server:
    assigning an HTTP client session from the set of HTTP client sessions to the application process; and
    sending the HTTP request from the application process to the remote server via the HTTP client session that is assigned; and
  in response to receiving a reply from the remote server:
    deselecting the HTTP client session from the application process; and
    sending the reply from the remote server to the application process.

14. The computer program product of claim 13, wherein the application process being a first application process, the HTTP request being a first HTTP request, the processing circuit configured to perform:
  in response to receiving a second HTTP request from a second application process, the second HTTP request is for communicating with said remote server:
    assigning said HTTP client session from the set of HTTP client sessions to the second application process; and sending the second HTTP request from the second application process to said remote server via said HTTP client session.

15. The computer program product of claim 13, wherein the set of HTTP client sessions includes a predetermined number of HTTP client sessions, the predetermined number is specific to the remote server.

16. The computer program product of claim 13, the HTTP client session is stored in a shared memory accessible by multiple application processes on the client computing device.

17. The computer program product of claim 13, wherein assigning the HTTP client session to the application process comprises setting an in-use flag associated with the HTTP client session and configuring an application-identifier parameter of the HTTP client session to an identifier of the application process.

18. The computer-implemented method of claim 1, wherein the set of HTTP client sessions for the remote server are created in response to the frequency of communication of the application process with said remote server is at least the predetermined threshold.

19. The system of claim 7, wherein the frequency of communication is representative of a number of communications of the application process with said server.

20. The computer program product of claim 13, wherein the frequency of communication is representative of a number of communications of the application process with said remote server.

* * * * *